United States Patent [19]
Chandler et al.

[11] Patent Number: 5,378,407
[45] Date of Patent: Jan. 3, 1995

[54] CONDUCTIVE POLYMER COMPOSITION

[75] Inventors: Daniel Chandler, Menlo Park; Nelson H. Thein, Union City; Edward F. Chu, Sunnyvale, all of Calif.

[73] Assignee: Raychem Corporation, Menlo Park, Calif.

[21] Appl. No.: 894,119

[22] Filed: Jun. 5, 1992

[51] Int. Cl.⁶ .................... H01B 1/00; H01B 1/14; H01B 1/16

[52] U.S. Cl. .................... 252/513; 252/512; 252/518; 252/519

[58] Field of Search .............. 252/512, 513, 518, 519

[56] References Cited

U.S. PATENT DOCUMENTS

| | | | |
|---|---|---|---|
| 2,795,680 | 6/1957 | Peck | 201/63 |
| 2,825,702 | 3/1958 | Silversher | 252/503 |
| 3,140,342 | 7/1964 | Ehrreich et al. | 174/52 |
| 3,278,455 | 10/1966 | Feather | 252/512 |
| 3,412,043 | 11/1968 | Gilliland | 252/514 |
| 3,571,777 | 3/1971 | Tully | 338/20 |
| 3,597,720 | 8/1971 | Burgess | 338/202 |
| 3,666,689 | 5/1972 | Groszek | 252/512 |
| 3,686,139 | 8/1972 | Lubin | 252/511 |
| 3,976,600 | 8/1976 | Meyer | 252/511 |
| 3,983,075 | 9/1976 | Marshall et al. | 252/511 |
| 4,237,441 | 12/1980 | van Konynenburg et al. | 338/22 R |
| 4,255,698 | 3/1981 | Simon | 320/35 |
| 4,308,314 | 12/1981 | Nakano et al. | 428/323 |
| 4,388,607 | 6/1983 | Toy et al. | 338/22 SD |
| 4,426,633 | 1/1984 | Taylor | 338/25 |
| 4,534,889 | 8/1985 | van Konynenburg et al. | 252/511 |
| 4,545,926 | 10/1985 | Fouts, Jr. et al. | 252/511 |
| 4,560,498 | 12/1985 | Horsma et al. | 252/511 |
| 4,591,700 | 5/1986 | Sopory | 219/505 |
| 4,610,808 | 9/1986 | Kleiner | 252/520 |
| 4,647,896 | 3/1987 | Ratell | 338/22 R |
| 4,685,025 | 8/1987 | Carlomagno | 361/106 |
| 4,689,475 | 8/1987 | Matthiesen | 219/553 |
| 4,724,417 | 2/1988 | Au et al. | 338/22 R |
| 4,726,991 | 2/1988 | Hyatt et al. | 252/507 |
| 4,732,701 | 3/1988 | Nishii et al. | 252/516 |
| 4,774,024 | 9/1988 | Deep et al. | 252/511 |
| 4,780,598 | 10/1988 | Fahey et al. | 219/511 |
| 4,800,253 | 1/1989 | Kleiner et al. | 219/553 |
| 4,884,163 | 11/1989 | Deep | 361/58 |
| 4,935,156 | 6/1990 | van Konynenburg et al. | 219/553 |
| 5,049,850 | 9/1991 | Evans | 338/22 R |
| 5,115,077 | 5/1992 | Matsuo et al. | 528/125 |

FOREIGN PATENT DOCUMENTS

| | | | |
|---|---|---|---|
| 922039 | 2/1973 | Canada | 400/72 |
| 1449321 | 7/1966 | France . | |
| 50-748 | 1/1975 | Japan | C08L 101/00 |
| 51-59947 | 5/1976 | Japan | C08K 3/00 |
| 53-28261 | 3/1978 | Japan | H01B 5/16 |
| 1-260711 | 10/1989 | Japan | H01B 1/22 |
| 760499 | 10/1956 | United Kingdom . | |
| 1369210 | 10/1974 | United Kingdom | C08G 43/00 |
| 1444722 | 8/1976 | United Kingdom | H05B 3/24 |
| 2000518 | 6/1977 | United Kingdom | C09D 5/24 |
| 1602372 | 11/1981 | United Kingdom | C08L 83/04 |

OTHER PUBLICATIONS

Search Report, PTC/US93/05335, Sep. 28, 1993.
ASTM B329-85, "Standard Test Method for Apparent Density of Powders of Refractory Metals and Compounds by the Scott Volumeter" 1985.

(List continued on next page.)

*Primary Examiner*—Paul Lieberman
*Assistant Examiner*—M. Kopec
*Attorney, Agent, or Firm*—Herbert G. Burkard; Marguerite E. Gerstner; Timothy H. P. Richardson

[57] ABSTRACT

A conductive polymer composition which has low resistivity and good electrical stability. In one aspect the composition comprises a nonconductive filler which is a dehydrated metal oxide. In another aspect the composition comprises a conductive filler which is metal particles in which the bulk density is less than 0.15 times the true density. Compositions of the invention are particularly useful for circuit protection devices.

14 Claims, 2 Drawing Sheets

OTHER PUBLICATIONS

"Electrical Conductivity and Heat Expansion to Filled Polymers", A. D. Stadnik, Izvestiya Vysshikh Uchebnikh Zavedeniy, Khimii, I. Khimicheskoy Tekhnologii, vol. 21, No. 7, pp. 1078–79 (1978).

"INCO Nickel Powders, Porperties and Applications", International Nickel, Inc., Dec, 1983.

"Investigation of Current–Interruption by Metal–filled Epoxy Resin", S. Littlewood and B. F. N. Briggs, J. Phys. D: Appl. Phys., vol. 11, pp. 1457–62 (1978).

"Solid State Bistable Power Switch Study", Herman Shulman & John Bartko, NASA Report N68–35634, Aug. 1968.

"Solid State Bistable Power Switch", NASA Technical Brief 70–10383 (1970).

"Solid–State Recoverable Fuse Functions as Circuit Breaker", Edward F. Thomas, NASA Technical Brief 66–10691. 1978.

FIG_1

FIG_2

FIG_3

FIG_4

CONDUCTIVE POLYMER COMPOSITION

BACKGROUND OF THE INVENTION

1. Field of the Invention

This invention relates to conductive polymer compositions, methods of making such compositions, and electrical devices comprising such compositions.

2. Introduction to the Invention

Conductive polymer compositions and electrical devices comprising them are well-known. Such compositions comprise a polymer, and dispersed in the polymer, a conductive particulate filler. The type and quantity of the conductive particles, as well as the type of the polymer, influence the resistivity of the composition. Generally for compositions with resistivities greater than about 1 ohm-cm, carbon black is a preferred filler. For compositions with lower resistivities, metal particles are used. Compositions comprising carbon black are described in U.S. Pat. Nos. 4,237,441 (van Konynenburg et al), 4,388,607 (Toy et al), 4,534,889 (van Konynenburg et al), 4,560,498 (Horsma et al), 4,591,700 (Sopory), 4,724,417 (Au et al), 4,774,024 (Deep et al), 4,935,156 (van Konynenburg et al), and 5,049,850 (Evans et al) Compositions comprising metal fillers are described in U.S. Pat. No. 4,545,926 (Fouts et al) and in U.S. application Ser. No. 07/788,655 (Baigrie et al), filed Nov. 6, 1991. The disclosure of each of these patents and pending applications is incorporated herein by reference.

In order to improve the electrical stability of conductive polymers it has been found that the addition of an inorganic filler such as alumina trihydrate is useful. Such compositions comprising carbon black, which are particularly useful for high voltage applications, i.e. exposure to voltages greater than about 100 volts, are described in U.S. Pat. Nos. 4,774,024 (Deep et al) and 5,049,850 (Evans et al). In addition, metal-filled compositions have been found to be more stable when a second filler, either another conductive filler such as a metal or carbon black or a nonconductive filler such as alumina trihydrate, is present. Such compositions are described in U.S. Pat. No. 4,545,926 (Fouts et al). These metal-filled compositions are designed to minimize resistance increase after exposure to high temperature conditions. High temperature conditions occur either as a result of cycling between an electrically powered and an unpowered state, or as a result of passive thermal treatment. Despite the objective of maintaining a relatively constant room temperature resistance after such exposure, these metal-filled compositions often do increase in resistance on cycling. Furthermore, it is difficult to make them reproducibly at a given low resistivity value.

SUMMARY OF THE INVENTION

We have now discovered, in accordance with a first aspect of the present invention, that the electrical stability of conductive polymers can be improved by the presence of certain non-conductive fillers. The conductive polymer can for example be any of those already known or disclosed in copending commonly assigned applications, including in particular those described in the patents and applications incorporated by reference herein, or any of those novel conductive polymers disclosed in this specification. The nonconductive fillers are compounds obtained by partial or complete dehydration of the hydrates of metal oxides under conditions which do not result in a substantial change in the particle structure of the hydrated metal oxide. It is believed that the voids which are present in such dehydrated fillers are at least in part responsible for the improved stability. It is theorized that these voids, during the preparation (including shaping) and/or during the use of the conductive polymers, encourage the formation of conductive pathways, and/or discourage the disruption of conductive pathways, by one or both of two mechanisms. The first mechanism is to scavenge and isolate undesirable gases or other moieties within the voids. The second is to provide nucleation sites which help such undesirable moieties to produce voids (or other imperfections) at locations which do not have an adverse effect on electrical properties.

We have further discovered, in accordance with a second aspect of the present invention, that conductive polymers having improved properties can be obtained through the use of a conductive filler comprising particles which (a) comprise metal, and (b) have a shape such that particles having the same shape and consisting of the same metal have a bulk density, as measured by ASTM B329, DB, which is q times the true density, DT, of the metal, where q is less than 0.15, preferably less than 0.10, particularly less than 0.075, especially less than 0.065.

Such conductive polymers can, but need not, contain a nonconductive dehydrated filler as specified in the first aspect of the invention.

We have further discovered, in accordance with a third aspect of the present invention, that when preparing a conductive polymer composition which comprises an organic polymer, a conductive filler which comprises a metal, and a non-conductive filler, improved results are obtained if at least these three components, and preferably also any additional components of the composition, are blended together at a temperature at which the polymer is a solid and while the polymer is in the form of a powder, and the resulting blend is then processed at a temperature above the melting point of the polymer. The conductive filler and/or the nonconductive filler can be, but need not be, a nonconductive dehydrated filler or a metal filler as specified in the first and second aspects of the present invention.

We have further discovered, in accordance with a fourth aspect of the present invention, that when (a) an article comprising a laminar conductive polymer element, e.g. a laminate comprising two laminar electrodes (e.g. metal foil electrodes) and a layer of a conductive polymer sandwiched between the electrodes, is produced by a hot-pressing step, e.g. a lamination step in which the electrodes are laminated to a sheet of the conductive polymer under heat and pressure, followed by a second pressing step in which the article is maintained under pressure while it cools (e.g. as described in U.S. Pat. No. 4,426,633 (Taylor), the disclosure of which is incorporated herein by reference), and (b) the conductive filler comprises particles whose shape can be changed by the pressures which can be exerted by the equipment used to carry out the second pressing step, for example (but not limited to) particles of the kind referred to in the second aspect of the invention, and in particular filamentary metal particles of the kind described in detail below, the pressure exerted on the conductive polymer during the second pressing step can have an important effect on the electrical properties of the product. In particular, a result of using too high a pressure can be to distort the filler particles and thus to increase the room temperature resistivity of the final product and/or decrease its switching temperature. This is in general disadvantageous. Thus the pressure should preferably be chosen to avoid that result (while, of course, maintaining it sufficiently high to produce the desired result of that step, e.g. adequate bonding between electrodes and the conductive polymer). However, there may be cases where the pressure is deliberately chosen to be high enough to produce that result. Another practical consequence of this discovery is the need to ensure, if the pressure is in the region where the electrical properties of the conductive polymer are sensitive to pressure, that there is a very uniform pressure over the whole area of the article and, if a number of such articles are stacked and pressed together, the same uniform pressure on each of the articles. Otherwise there will be an undesirable variation in the properties of supposedly identical electrical devices which are prepared from different parts of the same article or from different articles. In one embodiment of this aspect of the present invention, a second pressing step of the type described above is carried out using a pressure which is k times $P_{crit}$, where k is 0.5 to 0.95, preferably at least 0.6, particularly at least 0.65, especially at least 0.7, more especially at least 0.75, and preferably not more than 0.9, particularly not more than 0.8, and Pcrit is a pressure determined by a series of experiments which are identical to the procedure actually employed in the hot-pressing step and the second pressing step, except that the pressure in the second pressing step is varied and the resistivity of the conductive polymer at an identical position near the center of the press is measured after the second pressing step. The results of these experiments are recorded in the form of a graph of resistivity in ohm-cm at 23° C. (on the vertical axis) as a function of average pressure in kg/cm$^2$ (on the horizontal axis). Petit is the lowest pressure at which the resistivity is equal to 1.1 times the resistivity at a pressure equal to 0.9 times Petit. In another embodiment of this aspect of the present invention, a second pressing step of the type described above is carried out at an average pressure which is x times $P_{crit}$, where x is at least 0.8, for example at least 0.9, and generally not more than 2, preferably not more than 1.5, particularly not more than 1.2, and under conditions such that the maximum pressure on the conductive polymer at any point is not more than t times the minimum pressure on the conductive polymer at any point, where t is 1.2, preferably 1.1, particularly 1.05.

We have further discovered, in accordance with a fifth aspect of the present invention, that when an article comprising two metal foils and a layer of conductive polymer sandwiched between them, is irradiated, particularly to high dosages (as described for example in U.S. Pat. Nos. 4,845,838, 4,951,382, 4,951,384, and 4,955,267 (all Jacobs et al), the disclosures of which are incorporated herein by reference), nonuniformity of the radiation dose can result in stresses within the conductive polymer which are highly undesirable. Such stresses are particularly likely to occur when a stack of such articles, one on top of the other, is irradiated. They are also more likely to occur when the conductive polymer contains a high loading of the conductive filler, particularly a metal filler, for example a filler of the kind described in the second aspect of the invention. Such stresses can result in distortion or shrinkage of the sheet, and consequent delamination from an electrode or other article adjacent to the conductive polymer sheet. In one embodiment of this aspect of the invention, a plurality of articles, each comprising a laminar conductive polymer element, are stacked one on top of another and are irradiated in a plurality of steps. Between at least some of the radiation steps, the articles are shuffled (i.e. their order in the stack is changed) so that the radiation dose is sufficiently uniform, e.g. the maximum dose at any point is not more than 1.5 times, preferably not more than 1.4 times, particularly not more than 1.3 times, especially not more than 1.2 times, more especially not more than 1.1 times the minimum dose at any point.

DETAILED DESCRIPTION OF THE INVENTION

In the following detailed description of the invention, reference is frequently made to conductive polymers which exhibit PTC behavior, which comprise a conductive metal filler in accordance with the second aspect of the invention, a nonconductive dehydrated filler in accordance with the first aspect of the invention, and which are prepared by procedures in accordance with the third, fourth, and fifth aspects of the invention. It is to be understood, however, that where a feature which relates to only one aspect of the invention is disclosed in a particular context or as part of a particular combination, this specification should be regarded as explicitly disclosing that feature as part of the present invention, whether that feature is used on its own, or in another context or another combination, including, for example, another combination of two or more such features. For example, the dehydrated alumina filler described below can be used in conductive polymers which contain carbon black as the sole conductive filler, or in conductive polymers which exhibit zero temperature coefficient of resistance (ZTC) behavior, or in conductive polymers based on amorphous polymers.

The compositions of this invention preferably exhibit PTC behavior, i.e. they show a sharp increase in resistivity with temperature over a relatively small temperature range. In this specification, the term "PTC" is used to mean a composition or device which has an $R_{14}$ value of at least 2.5 and/or an $R_{100}$ value of at least 10, and it is particularly preferred that the composition or device should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. Generally the PTC compositions of the invention show increases in resistivity which are much greater than those minimum values.

The preferred PTC compositions of the present invention are conductive polymers which comprise a crystalline polymer component and, dispersed in the polymer component, a particulate filler component which comprises metal. The compositions generally have a resistivity of less than 10 ohm-cm, preferably less than 1 ohm-cm, particularly less than 0.1 ohm-cm, especially less than 0.05 ohm-cm. The polymeric component is preferably a crystalline organic polymer. Suitable crystalline polymers include polymers of one or more olefins, particularly polyethylene; copolymers of at least one olefin and at least one monomer copolymerisable therewith such as ethylene/acrylic acid, ethylene/ethyl acrylate, and ethylene/vinyl acetate copolymers; melt-shapeable fluoropolymers such as polyvinylidene fluoride and ethylene/tetrafluoroethylene copolymers (including terpolymers); and blends of two or more such polymers. For some applications it may be desirable to blend one crystalline polymer with another polymer, e.g. an elastomer, an amorphous thermoplastic polymer, or another crystalline polymer, in order to achieve specific physical or thermal properties, e.g. flexibility or maximum exposure temperature. For applications in which the composition is used in a circuit protection device, it is preferred that the crystalline polymer comprise polyethylene, particularly high density polyethylene. In compositions suitable for use in circuit protection devices in which the resistivity of the composition is less than 10 ohm-cm, the polymer component generally comprises 35 to 75% by volume of the total composition, preferably 40 to 70% by volume, particularly 45 to 65% by volume, e.g. 50 to 60% by volume.

The particulate filler component preferably comprises particles which are at least partly composed of metal. The term "metal" is used herein to include an alloy, though a single metal or a mixture of single metals is preferred. Therefore, for some applications, the particles are themselves metal, e.g. tungsten, copper, silver, molybdenum, or nickel, whereas for other applications the particles may comprise a nonconductive material, e.g. glass or ceramic, or a conductive material, e.g. carbon black, which has been at least partially coated with a metal to produce a filler with an appropriate resistivity. Alternatively, the particle may comprise metal which has been coated with another material of a different conductivity, e.g. a metal, a metal oxide, or carbon, in order to provide particles with improved dispersive tendencies, decreased arcing tendencies, improved hardness, or controlled resistivity. Thus, for example, nickel is commonly coated with a nickel oxide layer which prevents excessive aggregation during compounding. In general, the particulate filler comprises particles which have a resistivity of less than $10^{-3}$ ohm-cm, preferably less than $10^{-4}$ ohm-cm, particularly less than $10^{-5}$ ohm-cm. It is desirable that the polymer and the particulate filler form an interpenetrating network. Because of this, especially when the conductive polymer is subjected to a melt-shaping step, the preferred particle size and shape of the particulate filler are partially dependent on the nature of the crystalline polymer and the ability of the polymer to force the particles into a particular orientation or formation as the polymer crystallized from the melt. Those particles most often used generally have an average particle size of 0.1 to 50 $\mu$m, preferably 0.5 to 20 $\mu$m, particularly 1.0 to 10 $\mu$m, e.g. 1.0 to 5.0 $\mu$m. When the polymer comprises polyethylene, it is preferred that the average size of the particle be at least 1.0 $\mu$m, preferably at least 1.5 $\mu$m, particularly at least 2.0 $\mu$m. The shape of the particle is also important: particles such as spheres tend to produce devices which exhibit large resistance increases during thermal and electrical tests, whereas particles such as flakes or fibers tend to produce devices which exhibit electrical instability. In order to achieve optimum electrical and physical characteristics, it is preferred that the metal particles have a structure of the kind which is often referred to as "filamentary" but which is not a simple filament of constant cross-section but is, rather, dendritic in form. Such filamentary particles comprise generally spherical metal "beads" which are fused together to form a branched chain. Examples of such filamentary particles are shown in a product brochure from International Nickel, Inc., "INCO Nickel Powders, Properties and Applications", December, 1983, the disclosure of which is incorporated herein by reference.

Appropriate metal fillers generally have a bulk density $D_B$ of less than 1.3 g/cm$^3$, preferably less than 1.0 g/cm$^3$, particularly less than 0.8 g/cm$^3$. Bulk density, also referred to as apparent density, is the weight of a unit volume of powder in g/cm$^3$. The values set out herein are determined by following the procedure of ASTM B329, in which the weight of a known volume of a powder is determined under known conditions. Particularly useful compositions contain particulate metal fillers whose bulk density is q times the true density $D_T$ of the metal, where q is less than 0.15, preferably less than 0.10, particularly less than 0.075, especially less than 0.065. The true or elemental density of the metal is the weight per unit volume expressed as g/cm$^3$ of the metal, or when the filler comprises a coated metal or metal-coated nonconductive particle, the density of the composite filler. Particularly preferred for use as the metal filler is a filamentary nickel available from Novamet Corporation under the tradename Inco TM 255 which has a bulk density of about 0.55 g/cm$^3$ and a true density of 8.9 g/cm$^3$.

The metal filler is generally present in the composition at a loading of 20 to 50% by volume of the total composition, preferably 25 to 45% by volume, particularly 30 to 40% by volume, e.g. 30 to 35% by volume. The conductive filler component may also contain a second conductive filler, e.g. carbon black, graphite, a second metal or a metal oxide.

The composition preferably comprises a nonconductive filler in an amount 0 to 20% by volume of the total composition, preferably 5 to 15% by volume, particularly 10 to 15% by volume. In order to avoid producing a material which has a viscosity too high to be melt-processed in standard compounding equipment such as an extruder, the total amount by volume of the metal filler and the nonorganic filler generally should be at most 45% by volume of the total composition. This upper limit is subject to the viscosity of the crystalline organic polymer and the presence of other fillers, and may be different depending on the type of compounding equipment used. Suitable nonconductive fillers include alumina trihydrate, magnesium oxide, zeolites, quartz, and calcium hydride. Such a filler imparts resistance stability and flame retardancy to the composition. When the nonconductive filler is alumina trihydrate, it is preferred that it be in the form of X-alumina. X-alumina, also known as activated alumina, can be produced by heat-treating alumina trihydrate (Al$_2$O$_3$·3-H$_2$O) in air at a temperature of 450° to 1000° C. for a period sufficient to completely dehydrate the alumina trihydrate and convert the filler in a pseudo-morphic transition from alumina trihydrate to X-alumina. A treatment at 600° C. for 12 hours in air will produce X-alumina, the total time being dependent on the amount of material and the oven capacity. It is believed that the use of X-alumina improves the electrical performance over similar compositions which comprise alumina trihydrate for two reasons. First, X-alumina controls void formation better because it scavenges void-forming gases generated during arcing and because new voids are nucleated in positions, e.g. adjacent a nonconducting particle, where they are least detrimental. Second, unlike alumina trihydrate, X-alumina eliminates moisture which otherwise might form harmful voids during compounding, processing, and use.

The conductive polymer composition may comprise antioxidants, inert fillers, radiation crosslinking agents (often referred to as prorads), stabilizers, dispersing agents, or other components. To improve the melt-processability of the composition, and to produce greater homogeneity, resistance uniformity, higher yields, and improved electrical life, it is preferred that a coupling agent, particularly a titanate coupling agent, be used. Substituted titanates, e.g. zirconium titanate, are particularly preferred. The coupling agent is present at 0 to 5% by volume, preferably 1 to 3% by volume, particularly 1 to 2% by volume of the total composition, e.g. 1.25 to 1.75% by volume.

Dispersion of the conductive filler and other components may be achieved by melt-processing, solvent-mixing, or any other suitable means. In order to achieve low resistivity at a low metal filler loading, it is preferred that mixing equipment which provides low shear mixing be used. Increased shear results in high resistivity and destruction of the structure of the metal filler, requiring more metal filler for a given resistivity level, increasing the cost and damaging the physical properties of the compound. In order to avoid mechanical fusion of the metal particles into aggregates during compounding, it is desirable that the metal be "diluted" or mixed with the other ingredients prior to melt-processing. Thus the metal can be preblended, e.g. by means of a V-mixer or a conical blender, with the nonconductive filler and/or the polymer. It is particularly preferred that the crystalline polymer be in the form of a powder and that all of the components be premixed. Such preblending minimizes the formation of aggregates which can act as sites for physical splitting of extruded sheet or sites for electrical failure during testing of devices prepared from the compound.

The compound can be melt-shaped by any suitable method to produce devices. Thus, the compound may be melt-extruded, injection-molded, or sintered. For many applications, it is necessary that the compound be extruded into sheet. To avoid melt-fracture which creates cracks and voids which are potential sites for arcing in a device, a very low shear rate die is preferably used. If melt-fracture does occur, the extruded sheet can be treated, e.g. by hot-pressing, to remove the fractures. For most materials, an extrusion temperature of 15° to 115° C. higher than the melting point of the crystalline organic polymer (as determined by the peak of melting on a differential scanning calorimeter trace) is needed. At temperatures below this range, the melt viscosity of the composition tends to be too high; at temperatures above this range, surging tends to occur in the die. Thus for compositions in which the polymer is high density polyethylene, a temperature range of 150° to 240° C. is generally appropriate. Mechanical stresses inherent in the melt-shaped compound can be relieved by heat-treatment, e.g. by heating at a temperature slightly above the melting point of the polymer in vacuum for a period of 2 to 48 hours.

The compositions of the invention can be used to prepare electrical devices, e.g. circuit protection devices, heaters, or resistors. Although the circuit protection devices can have any shape, e.g. planar or dogbone, particularly useful circuit protection devices of the invention comprise two laminar electrodes, preferably metal foil electrodes, and a conductive polymer element sandwiched between them. Particularly suitable foil electrodes are disclosed in U.S. Pat. Nos. 4,689,475 (Matthiesen) and 4,800,253 (Kleiner et al), the disclosure of each of which is incorporated herein by reference. We have found that it is important to control the temperature and pressure conditions during the lamination of the metal foils onto the conductive polymer element. In a conventional lamination procedure, the conductive polymer material is positioned between two metal foil electrodes, and the laminate is exposed first to high pressure (e.g. at least 100 lbs/in$^2$ (7 kg/cm$^2$), and generally higher) at a temperature above the melting point of the polymer (i.e. the "hot-press step"), and then to a similar high pressure (e.g. at least 100 lbs/in$^2$ (7 kg/cm$^2$), and generally higher) at a temperature well below the melting point of the polymer, in particular at room temperature or below (i.e. the "cold-press step"). For the compositions of the invention, devices with improved stability have been produced when a lower pressure is used during the cold-press step than during the hot-press step. For many compositions of the invention, the maximum pressure to which the composition is exposed during the cold-press step is at most 10,000 lbs/in$^2$ (700 kg/cm$^2$), preferably at most 1000 lbs/in$^2$ (70 kg/cm$^2$), particularly at most 200 lbs/in$^2$ (14 kg/cm$^2$). If the conductive polymer composition is exposed to a relatively high pressure during the cold-press step, we have found that the switching temperature, $T_s$, i.e. the temperature at which the device switches from a low to a high resistance state, will decrease by 5° to 20° C., and the resistivity at room temperature will increase.

The devices usually comprise leads which are secured, e.g. soldered or welded, to the electrodes. These leads can be suitable for insertion into a printed circuit board and may be constructed so that they do not inhibit expansion of the device, as disclosed for example in U.S. Pat. No. 4,685,025 (Carlomagno), the disclosure of which is incorporated herein by reference. Leads may also be prepared so that devices can be surface-mounted onto a printed circuit board. However, devices of the invention are particularly suitable for applications, e.g. battery protection as described in U.S. Pat. No. 4,255,698 (Simon), the disclosure of which is incorporated herein by reference, in which the leads are in the form of ribbons or straps which are electrically connected to a substrate, such as a battery terminal. Because the resistance of the devices is so low, e.g. generally 0.0005 to 0.015 ohms, the resistance of the leads, even if composed of a low-resistance metal, can comprise a substantial proportion of the total device resistance. Thus the leads can be selected to influence or control the thermal properties of the device, including the rate at the which the device trips into a high resistance state.

The device can be encapsulated to provide electrical insulation and environmental protection, e.g. from moisture and/or oxygen. Suitable encapsulants include epoxies, silicone resins, glass, or insulating tapes.

For many applications, the electrical stability of the device (as defined by one or more of improved resistance stability when powered, decreased failure rate, increased voltage withstand capability, and lower surface temperature) is enhanced if the composition is crosslinked. Crosslinking can be accomplished by chemical means or by irradiation, e.g. using an electron beam or a $Co^{60}$ γ irradiation source. Due to the high density of the metal-filled compound compared to conventional carbon black-filled conductive polymer compositions, electrons from an electron beam are readily reflected and deflected by the metal, tending to generate high temperatures which can be detrimental to the polymer. Therefore, for most applications, it is preferred that a low beam current (e.g. 5.5 mA with a 3.0 MeV electron beam) be used and a low temperature be maintained. Thus the temperature preferably should remain below the melting point of the polymer by a margin which is generally at least 10° C., preferably at least 15° C., particularly at least 20° C., e.g. 25° to 30° C. If the temperature is allowed to increase, for example, due to a high beam current (e.g. >7 mA with a 3.0 MeV electron beam), some crosslinking will tend to occur in the melt, resulting in a composition which exhibits a PTC anomaly at a lower temperature than expected. During irradiation, stresses may be induced in the composition as a result of a nonuniform irradiation profile across the composition. Such stresses can produce a nonuniform crosslinking density, resulting in shrinkage and distortion of the sheet and delamination of foil electrodes. Particularly is this so when irradiating a stack of individual sheets or laminates (each comprising two metal foils and a sheet of conductive polymer between the foils). In order to minimize the effects of the nonuniform irradiation profile, it is useful to irradiate the stack in several steps, interchanging the sheets or laminates between the steps to achieve uniform irradiation. For most compositions, the total dose is preferably at least 10 Mrads, but no more than 150 Mrads. Thus irradiation levels of 10 to 150 Mrads, preferably 25 to 125 Mrads, particularly 50 to 100 Mrads, e.g. 60 to 80 Mrads, are useful. If the conductive polymer is to be laminated between sheet electrodes, irradiation may be conducted either before or after the lamination.

The low resistivity (<$10^{-1}$ ohm-cm) and high PTC anomaly (in some instances, more than 10 decades of resistance change) of compositions of the invention make them suitable for use in a number of applications in which conventional carbon black-filled compositions are inadequate. For example, when used in a thermal protector, the high PTC anomaly of the composition permits less leakage current at elevated ambient temperature than a typical carbon loaded device. The low resistivity allows very small devices to be prepared, thus minimizing space requirements. Such small devices are particularly useful on printed circuit boards, e.g. to protect computer mother boards and disk drives; in compact battery packs for hand-held devices, e.g. video cameras and power tools; for thermal protection of compact electrical components, e.g. tantalum capacitors; and for protection of small devices which require large operating currents, e.g. high torque motors. If the metal filler which is used is nickel, the device will be magnetic and will heat efficiently in the presence of an inductive field. Such devices can be used as induction switches. Because the materials are very thermally conductive, they can act as self-regulating heat-sinks. The thermal conductivity, like the electrical resistivity, undergoes a discontinuity near the melting point of the polymer. As a result, the composition adjusts its ability to conduct heat in response to temperature, restricting heat transfer at high temperatures. Devices prepared from the compositions of the invention can be thermally coupled with a conventional conductive polymer device to produce an interlock device for circuit protection. When an over-current event causes the conventional device to switch into its high resistance state and, as a result, to heat, the metal-filled device is driven to a high resistance state which configures a second independent circuit in the open state. The devices also can be thermally and/or electrically coupled to other electrical components, e.g. varistors, to form a composite device in a manner disclosed in U.S. Pat. No. 4,780,598 (Fahey et al), the disclosure of which is incorporated herein by reference. Devices of the invention have a sufficiently low resistance that the device does not degrade the voltage clamp performance of the varistor during normal operating conditions. In the event of an overvoltage condition of long duration (i.e. more than a few seconds), however, the PTC device switches into a high resistance state and protects the varistor from overheating and self-destructing.

Figure 1:
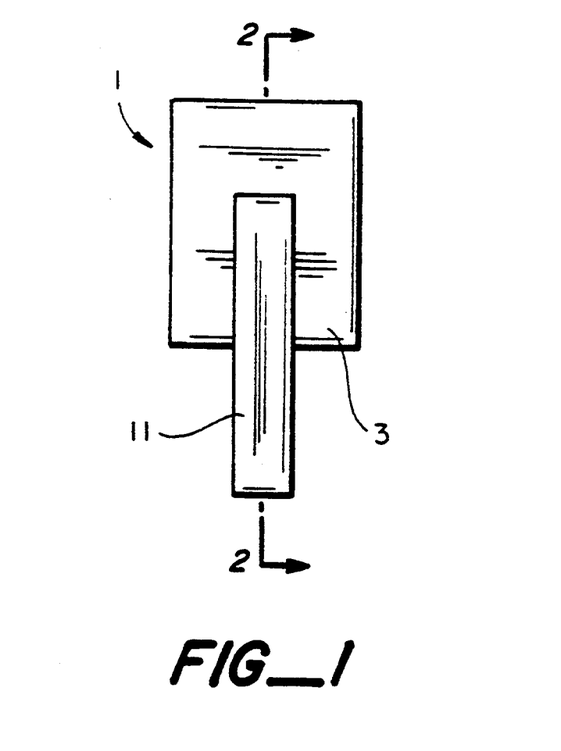
FIG. 1 is a plan view of a device of the invention.
Figure 2:
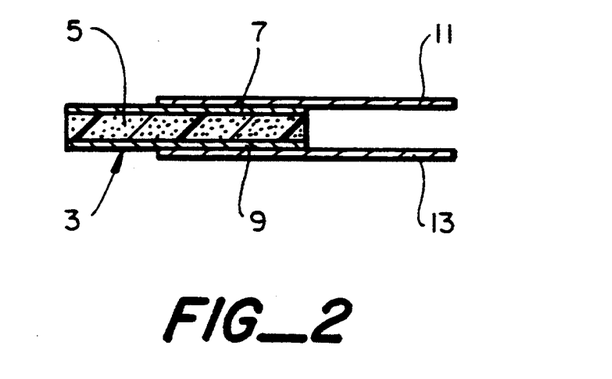
FIG. 2 is a cross-sectional view of the device of FIG. 1 along line 2—2.
Figure 3:
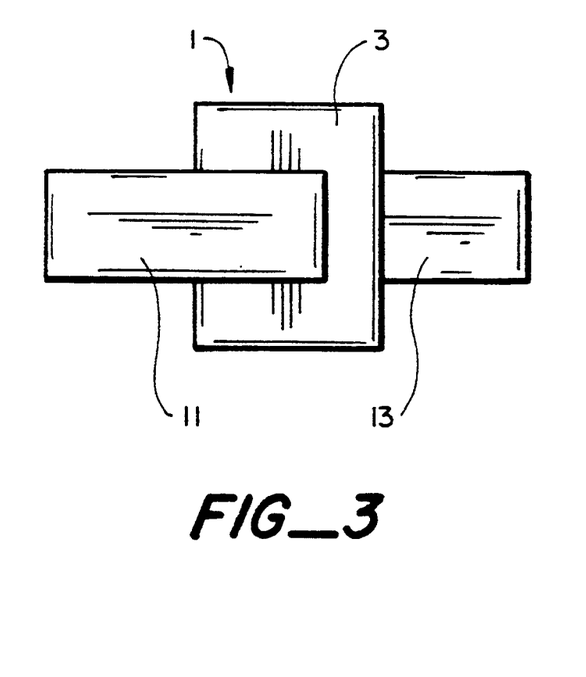
FIG. 3 is a plan view of another device of the invention.

The invention is illustrated by the drawing in which FIG. 1 is a plan view of a circuit protection device 1 and FIG. 2 is a cross-sectional view along line 2—2. The device consists of a PTC element or chip 3 to which are attached metal leads 11,13. The PTC element 3 comprises a conductive polymer element 5 which is sandwiched between two metal electrodes 7,9. FIG. 3 shows an alternative configuration for the leads 11,13 to give a device suitable for attachment to the terminals of a battery.

Figure 4:
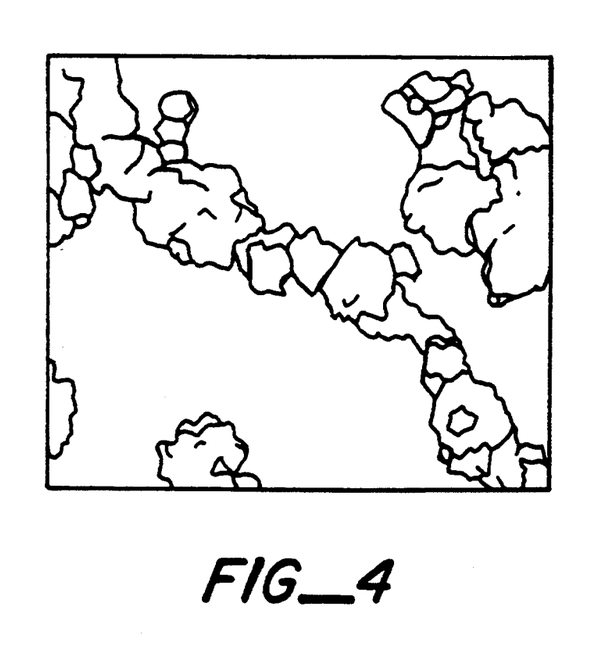
FIG. 4 is a schematic example of a preferred filamentary conductive filler.

FIG. 4 is a schematic drawing of a filamentary nickel particle which is suitable for use in compositions of the invention.

The invention is illustrated by the following examples.

EXAMPLE 1

Alumina trihydrate (Micral TM 916, available from J. M. Huber Chemicals) was heated for 16 hours at 600° C. to achieve a weight loss of at least 30%. Approximately 6.8% by weight dried alumina trihydrate was dry-blended with 93.2% by weight nickel powder (Inco TM 255, available from Novamet) in a Patterson-Kelly V-blender until the color was uniform. The nickel-/alumina trihydrate mixture was then dry-blended in a ratio of 6.03:1 with ground high density polyethylene (Petrothene TM LB832 G, available from Quantum Chemicals) using a conical mixer. The ingredients were mixed with a zirconate coupling agent (NZ TM 33, available from Kenrich) in a preheated Moriyama mixer for a total of 20 minutes to give the final composition listed in Table I. The mixture was granulated and dried at 80° C. for 16 hours before being extruded through a 1.5 inch (38 mm) extruder to produce a sheet (0.030×9 inch/0.76 mm×0.23 m). The sheet was cut into 12 inch (0.030 m) lengths and dried at 140° C. in vacuum for 16 hours. Electrodes were attached to the extruded sheet by laminating 0.001 inch (0.025 mm) electrodeposited nickel foil (available from Fukuda) by a process which required first that the extruded sheet be positioned between two sheets of nickel foil, two Teflon TM -coated release sheets, two silicone rubber pads, two Teflon TM -coated release sheets, and two metal plates, and then be exposed to contact pressure (about 37 lbs/in$^2$;

2.6 kg/cm$^2$) at 200° C. for three minutes, 200 to 400 lbs/in$^2$ (14 to 28 kg/cm$^2$) at 200° C. for three minutes, and 200 to 400 lbs/in$^2$ (14 to 28 kg/cm$^2$) at room temperature for three minutes. The laminated sheet was dried at 70° C. for 16 hours in vacuum before irradiation. Four laminated sheets were positioned in a stack and irradiated to a total dose of 80 Mrad using a 3.0 MeV electron beam at a beam current of 5 mA. The 80 Mrad total dose was accumulated in four 20 Mrad steps, rotating the laminated sheet from the bottom to the top of the stack following each 20 Mrad increment. The crosslinked sheet was dried at 70° C. for 16 hours in vacuum before solder dipping and dicing into individual chips. The chips were 0.20×0.43 inch (5×11 mm) and had a resistance of 0.015 to 0.018 ohm. Metal leads (1.38×0.12 inch/35×3 ram) were attached to the surfaces of each chip to give a device as shown in FIGS. 1 and 2.

TABLE I

| Component | Supplier | Components Volume % | Weight % |
|---|---|---|---|
| Polyethylene (Petrothene TM LB832 G) | Quantum Chemicals | 55.7 | 14.2 |
| Nickel (Inco TM 255) | Novamet | 33.7 | 79.6 |
| Alumina trihydrate (Micral TM 916) | J. M. Huber | 9.1 | 5.8 |
| Coupling agent (NZ TM 33) | Kenrich | 1.5 | 0.4 |

Each device was temperature cycled from −40° to +80° C. six times, holding the device at each temperature for 30 minutes. Devices were tested for cycle life by using a circuit consisting of the device in series with a switch, a 6 volt DC power source, and a fixed resistor which limited the initial current to 15A. The test consisted of a series of test cycles. Each cycle consisted of closing the switch for 3 seconds, thus tripping the device, and then allowing the device to cool for 60 seconds. A device was deemed to have failed when it overheated, causing the leads to detach, or when its resistance at 23° C. had increased to twice its initial resistance at 23° C. Other tests were conducted using a similar circuit in which the power source was varied from 12 to 48 volts DC and the current was limited to 40 or 100A. The results are shown in Table II.

TABLE II

| | Cycle Life Performance | | |
|---|---|---|---|
| Voltage | Current | Number of Cycles | First Cycle to Failure |
| 6 VDC | 15A | 6000 | No failures |
| 6 VDC | 40A | 1000 | No failures |
| 6 VDC | 100A | 1000 | No failures |
| 12 VDC | 40A | 1000 | No failures |
| 12 VDC | 100A | 1000 | No failures |
| 24 VDC | 40A | 1000 | 21 |
| 48 VDC | 40A | 1000 | 3 |

EXAMPLE 2

Devices were prepared as in Example 1 except that the size was 0.20×0.55 inch (5×14 mm). Thirty devices were tested for cycle life by using a circuit as in Example 1 in which the power source was 12 volts DC and the fixed resistor limited the initial current to 40A. Each test cycle consisted of closing the switch for 10 seconds to trip the device, and then allowing the device to cool for 180 seconds. As shown in Table III, all devices survived 1000 cycles without failure.

Additional devices were also tested for trip endurance. In this test, the device, in series with a 15 volt DC power supply, was tripped, and then was maintained in its tripped state until failure, as indicated by burning, occurred. Of the devices in which the fillers and the polymer were preblended, 100% survived more than 3000 hours.

EXAMPLE 3

Devices were prepared as in Example 1 except that the fillers and the polymer were not preblended. During compounding, the nickel powder and alumina trihydrate were slowly added to the molten polymer until mixing was complete. Testing was conducted as in Example 2. In the cycle life test, 63% of the devices failed before 500 cycles In the trip endurance test, the time of survival was only 400 hours.

TABLE III

| Example | Components Premixed | Cycle Life (% Survival) | | Trip Endurance (hours) |
|---|---|---|---|---|
| | | 500 cycles | 1000 cycles | |
| 2 | Yes | 100% | 100% | >3000 |
| 3 | No | 63% | | 400 |

EXAMPLES 4 TO 7

Different types of nickel were tested using the following procedure. Using a Brabender mixer heated to 200° C., 40% by volume nickel, as shown in Table IV, was mixed with 53.5% by volume polyethylene (Petrothene TM LB832 G), 5% by volume alumina trihydrate as prepared in Example 1, and 1.5% by volume coupling agent. The compound was compression molded into plaque (0.020 inch/0.51 mm thick) and each plaque was laminated with metal foil electrodes as in Example 1. Each plaque was irradiated to 20 Mrad using a 3 MeV electron beam, and was cut into devices with dimensions of 0.5×0.5×0.02 inch (12.7×12.7×0.51 mm). Copper wire leads (18 AWG; 0.040 inch/1.0 mm diameter) were attached to each of the metal foil surfaces. The initial device resistance $R_i$ was measured for each device. Resistance stability was measured by testing each device for trip endurance. Devices were powered at 15 volts DC and were maintained in the tripped state at 15 volts DC for 100 hours before the power was removed and the devices were cooled. The final device resistance $R_f$ was measured and the ratio $R_f/R_i$ was calculated. The device resistance was considered unstable if the ratio $R_f/R_i$ was more than 10; a ratio $R_f/R_i$ of 5 to 10 indicated that the resistance was metastable. Devices were determined to have stable resistance if the ratio $R_f/R_i$ was less than 5 during the test. Devices with stable resistance generally had a ratio $R_f/R_i$ of less than 2.

TABLE IV

| Example | 4 | 5 | 6 | 7 |
|---|---|---|---|---|
| Nickel Type | ICD SNP-030 | ONF | Inco 123 | Inco 255 |
| Supplier | Sumitomo | Sherritt | Novamet | Novamet |
| Particle Shape | Spherical | Spherical | Spiked Sphere | Filamentary |
| Bulk Density (g/cm$^3$) | 1.5 | 1.45 | 1.8 | 0.55 |
| Average Particle Size (μm) | 0.3 | 1.0 | 2.8 | 2.5 |
| Surface Area (m$^2$/g) | N/A | N/A | 0.39 | 0.68 |
| Resistivity (ohm-cm) | 1 × 10$^7$ | 2 × 10$^6$ | 0.05 | 0.003 |
| Resistance Stability | unstable | unstable | metastable | stable |

EXAMPLES 8 AND 9

Following the procedure of Examples 4 to 7, compositions were prepared using the 35% by volume nickel as shown in Table V, 53.5% by volume polyethylene (Petrothene TM LB832 G), 10% by volume alumina trihydrate prepared as in Example 1, and 1.5% by volume coupling agent. Devices were prepared as in Examples 4 to 7, and then were tested by determining the resistivity versus temperature characteristics of the devices over a temperature range from 0° C. to 160° C. The devices prepared from Example 8, in which the nickel had a comparable bulk density but a smaller particle size and larger surface area than that of the nickel of Example 9, exhibited less than one decade of PTC anomaly, compared to more than 10 decades for Example 9.

TABLE V

| Example | 8 | 9 |
|---|---|---|
| Nickel | Inco 210 | Inco 255 |
| Supplier | Novamet | Novamet |
| Particle shape | Filamentary | Filamentary |
| Bulk Density (g/cm$^3$) | 0.50 | 0.55 |
| Average Particle Size (μm) | 0.94 | 2.5 |
| Surface Area (m$^2$/g) | 1.86 | 0.68 |
| Resistivity (ohm-cm) | 0.09 | 0.003 |
| PTC Anomaly (decades) | <1 | >10 |

EXAMPLES 10 TO 12

Using a Brabender mixer heated to 200° C., the ingredients listed in Table VI were mixed. For Example 12, the alumina trihydrate had been heated as in Example 1. Devices with dimensions of 0.5×0.5×0.020 inch (12.7×12.7×0.51 mm) were prepared and irradiated following the procedure of Examples 4 to 7. Copper wire leads (18 AWG; 0.040 inch/1.0 mm diameter) were attached to each of the metal foil surfaces. Devices were tested for cycle life by using a circuit consisting of the device in series with a switch, a 15 volt power supply, and a fixed resistor which limited the initial current to 100A. The test consisted of a series of test cycles, each cycle consisting of closing the switch for 10 seconds, thus tripping the device, and then allowing the device to cool for 180 seconds. A device was deemed to have failed when it overheated or when its resistance at 23° C. had increased to 15 times its initial resistance at 23° C. Sixteen devices of each type were tested. The composition which contained the dehydrated alumina trihydrate did not show a failure until more than 6000 cycles, compared to the composition without alumina trihydrate which showed a failure at 300 cycles, and the composition with hydrated alumina trihydrate which showed a failure at about 1000 cycles.

TABLE VI

| Component | Example 10 | | Example 11 | | Example 12 | |
|---|---|---|---|---|---|---|
| | Vol % | Wt % | Vol % | Wt % | Vol % | Wt % |
| High density polyethylene (Petrothene TM LB832 G) | 68.5 | 20.3 | 53.5 | 15.0 | 53.5 | 15.5 |
| Nickel (Inco TM 255) | 30.0 | 79.3 | 30.0 | 74.5 | 30.0 | 77.5 |
| Al$_2$O$_3$.3H$_2$O (Micral TM 916) | | | 15.0 | 10.1 | | |
| Al$_2$O$_3$.3H$_2$O dehydrated (Micral TM 916) | | | | | 15.0 | 6.5 |
| Coupling agent (NZ TM 33) | 1.5 | 0.4 | 1.5 | 0.4 | 1.5 | 0.5 |
| Cycles to failure | 300 | | 1000 | | 6000 | |

EXAMPLE 13

Following the procedure of Examples 10 to 12, devices were prepared from a composition containing 55% by volume high density polyethylene (Petrothene TM LB832 G), 30% by volume nickel (Inco TM 255), and 15% by volume alumina trihydrate (ATH) (Micral TM 916) and were irradiated 20 Mrad. Devices were tested for cycle life at 15 volts DC/100A. As shown in Table VII, the resistance increased rapidly during the first 50 cycles.

EXAMPLE 14

Devices were prepared and tested as in Example 13, but instead of hydrated alumina trihydrate, 15% by volume of dehydrated alumina trihydrate prepared as in Example 1, was used. When tested for cycle life, as shown in Table VII, the devices showed greater stability than those of Example 13.

TABLE VII

| Example | Resistance in milliohms Cycle | | | | | | | | | | |
| --- | --- | --- | --- | --- | --- | --- | --- | --- | --- | --- | --- |
| | 0 | 10 | 20 | 30 | 40 | 50 | 60 | 70 | 80 | 90 | 100 |
| 13: hydrated ATH | 2 | 8 | 18 | 31 | 37 | 38 | 36 | 34 | 32 | 31 | — |
| 14: χ-alumina | 1 | 4 | 8 | 11 | 11 | 10 | 10 | 9 | 8 | 7 | 7 |

EXAMPLE 15

Devices with dimensions of 0.5×0.5×0.030 inch (12.7×12.7×0.76 mm) were prepared using the composition of Example 1 and following the procedure of Examples 4 to 7 except that the devices were not irradiated. The devices were tested for cycle life as in Examples 10 to 12. The devices showed a dramatic increase in resistance during the first 30 cycles, followed by a decrease to 430 cycles. The results are shown in Table VIII.

EXAMPLE 16

Devices were prepared and tested as in Example 15 except that the electrode-laminated sheet had been irradiated 10 Mrads prior to cutting the devices. The device resistance showed a slow increase over 500 cycles of the test, as indicated in Table VIII.

TABLE VIII

| Example | Resistance in milliohms Cycle | | | | | | | | |
| --- | --- | --- | --- | --- | --- | --- | --- | --- | --- |
| | 0 | 15 | 33 | 66 | 100 | 200 | 300 | 400 | 500 |
| 15: 0 Mrad | 3 | 14 | 30 | 25 | 20 | 15 | 12 | 11 | 10 |
| 16: 10 Mrad | 2 | 3 | 4 | 6 | 9 | 15 | 16 | 17 | 17 |

EXAMPLE 17

Devices were prepared as in Example 1 in which the chip dimensions were 0.20×0.43 inch (5×11 mm). Nickel leads (0.12×1.38×0.045 inch/3.0×35×0.12 mmz) were attached to the surfaces of each chip to give a device as shown in FIGS. 1 and 2. The average power output of the device was 0.5 watt. When tested for cycle life (15 VDC/100A inrush current; 10 seconds on/200 seconds off), 50% of the devices failed by 100 cycles.

EXAMPLE 18

Devices were prepared and tested as in Example 17 except that instead of nickel leads, copper leads with dimensions of 0.43×0.55×0.045 inch (11×14×0.12 mm) were attached to the surface to give a device as shown in FIG. 3. When tested for cycle life at 15 VDC/100A, 100% of the devices survived 100 cycles. In addition, the average power output, 2.5 watt, was 5 times greater than for the devices of Example 17.

EXAMPLE 19

Using a Brabender mixer heated to 235° C., 55% by volume polyvinylidene fluoride (Kynar TM 460, available from Pennwalt), 35% by volume nickel (Inco TM 255, available from Novamet), and 10% by volume alumina trihydrate (Micral TM 916, available from J. M. Huber Chemicals and prepared as in Example 1) were mixed. The compound was laminated between two sheets of 0.001 inch (0.025 mm) electrodeposited nickel foil (available from Fukuda), and the laminated sheet was irradiated in two 40 Mrad steps to a total of 80 Mrad. Devices with a resistivity of 0.015 ohm-cm were obtained. These devices, which had a resistance of about 0.003 ohms, exhibited 5 decades of resistance change (i.e. PTC anomaly) between 110° and 160° C.

What is claimed is:

1. A conductive polymer composition which comprises
   (1) 40 to 70% by volume crystalline organic polymer which comprises a polyolefin, a copolymer of at least one olefin and at least one monomer copolymerisable therewith, or a fluoropolymer;
   (2) 25 to 40% by volume conductive particulate filler which is dispersed in the organic polymer and which comprises particles which
      (a) comprise nickel,
      (b) have a shape such that particles having the same shape and consisting of the same metal have a bulk density DB as measured by ASTM B329 which is (i) less than 1.3 g/cm³ and (ii) q times the true density DT of the metal, where q is less than 0.15,
      (c) have a filamentary structure; and
   (3) a nonconductive filler which is obtained substantially complete dehydration of a hydrate of a metal oxide.

2. A composition according to claim 1 wherein the nonconductive filler is present at up to 20% by volume.

3. A composition according to claim 2 wherein the nonconductive filler comprises alumina trihydrate.

4. A composition according to claim 2 wherein the nonconductive filler comprises X-alumina.

5. A composition according to claim 1 wherein the conductive particles have a particle size of at least 1.0 μgm.

6. A composition according to claim 1 wherein the conductive particles have a bulk density of less than 1.0 g/cm³.

7. A composition according to claim 1 wherein the crystalline organic polymer comprises polyethylene.

8. A composition according to claim 1 wherein the conductive particles have an average particle size of 0.5 to 20 microns.

9. composition according to claim 2 wherein the nonconductive filler is present at 5 to 15% by volume.

10. A composition according to claim 1 which exhibits PTC behavior.

11. A composition according to claim 1 which has a resistivity of less than 1 ohm-cm.

12. A PTC conductive polymer composition which consists essentially of
    (1) 40 to 75% by volume crystalline organic polymer, which comprises a polyolefin, a copolymer of at least one olefin and at least one monomer copolymerisable therewith, or a fluoropolymer;
    (2) 25 to 40% by volume nickel particles which have a filamentary structure,
    (3) 1 to 20% by volume X-alumina, and
    (4) 0 to 5% by volume coupling agent.

13. A composition according to claim 12 wherein the nickel has a bulk density of less than 1.0 g/cm³.

14. A composition according to claim 12 wherein the coupling agent comprises a zirconate coupling agent.

* * * * *

UNITED STATES PATENT AND TRADEMARK OFFICE
CERTIFICATE OF CORRECTION

PATENT NO. : 5,378,407                                           Page 1 of 2
DATED     : January 3, 1995
INVENTOR(S) : Chandler, et al It is certified that error appears in the above-indentified patent and that said Letters Patent is hereby corrected as shown below:

Cover Page, References Cited, Foreign Patent Documents, line 2, after "France" insert ---H01B--.

Column 1, line 25, replace "(Evans et al)" by --(Evans et al).--.

Column 2, line 10, replace "moleties" by -- moieties--.

Column 2, line 23, replace "DB" by --$D_B$--.

Column 2, line 24, replace "DT" by --$D_T$--.

Column 3, line 31, replace "Perit" by --$P_{crit}$--.

Column 3, line 41, replace "Petit" by --$P_{crit}$--.

Column 3, line 43, replace "Petit" by --$P_{crit}$--.

Column 11, line 16, replace "3 ram)" by --3 mm)--.

Column 15, line 41, replace "mmz)" by --mm)--.

Claim 1, line 13, Replace "DB" by --$D_B$--.

Claim 1, line 15, replace "DT" by --$D_T$--.

UNITED STATES PATENT AND TRADEMARK OFFICE
CERTIFICATE OF CORRECTION

PATENT NO. : 5,378,407
DATED : January 3, 1995
INVENTOR(S) : Chandler, et al

It is certified that error appears in the above-indentified patent and that said Letters Patent is hereby corrected as shown below:

Column 16:

Claim 1, line 18, after "obtained", insert --by--.

Claim 4, line 2, replace "X-alumina" by --$\chi$-alumina--.

Claim 5, line 3, replace "$\mu$gm" by --$\mu$m--.

Claim 12, line 9, replace "X-alumina" by --$\chi$-alumina--.

Signed and Sealed this

Sixteenth Day of May, 1995

Attest:

BRUCE LEHMAN

Attesting Officer    Commissioner of Patents and Trademarks